(12) United States Patent
Chitta et al.

(10) Patent No.: US 7,075,254 B2
(45) Date of Patent: Jul. 11, 2006

(54) LIGHTING BALLAST HAVING BOOST CONVERTER WITH ON/OFF CONTROL AND METHOD OF BALLAST OPERATION

(75) Inventors: Venkatesh Chitta, Center Valley, PA (US); Brent M. Gawrys, Allentown, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 24 days.

(21) Appl. No.: 11/011,468

(22) Filed: Dec. 14, 2004

(65) Prior Publication Data

US 2006/0125423 A1 Jun. 15, 2006

(51) Int. Cl.
*G05F 1/00* (2006.01)

(52) U.S. Cl. .................. 315/307; 315/308; 315/291; 315/224; 315/127; 315/DIG. 5; 315/DIG. 7; 315/209 R (58) Field of Classification Search ............... 315/307, 315/291, 308, 127, 209 R, DIG. 7, DIG. 5, 315/224, 244, 241 R, 194
See application file for complete search history.

(56) References Cited

U.S. PATENT DOCUMENTS

| | | | |
|---|---|---|---|
| 5,872,429 A * | 2/1999 | Xia et al. .................... | 315/194 |
| 5,925,990 A * | 7/1999 | Crouse et al. ............... | 315/307 |
| 6,181,084 B1 * | 1/2001 | Lau ............................. | 315/291 |
| 6,856,100 B1 * | 2/2005 | Konopka ..................... | 315/224 |

* cited by examiner

*Primary Examiner*—Don Wong
*Assistant Examiner*—Chuc Tran
(74) *Attorney, Agent, or Firm*—Ostrolenk, Faber, Gerb & Soffen, LLP (57) ABSTRACT

A ballast for driving a gas discharge lamp comprising a rectifier stage having an alternating current (AC) input and providing a rectified output voltage, a boost converter stage receiving the rectified output voltage as an input and providing a boosted direct current (DC) output voltage across a DC bus, an inverter output stage for converting the DC bus voltage to a high-frequency AC output voltage to drive the lamp, further comprising a control stage receiving a desired light level signal controlling the desired light level of the lamp and providing an output control signal for turning the boost converter stage on or off in dependency on the desired light level signal. The ballast thereby has reduced power consumption at low light levels for greater energy efficiency.

43 Claims, 8 Drawing Sheets

LIGHTING BALLAST HAVING BOOST CONVERTER WITH ON/OFF CONTROL AND METHOD OF BALLAST OPERATION

BACKGROUND OF THE INVENTION

The present invention relates to a lighting ballast, in particular, to an electronic dimming ballast having a front end having an input coupled to an alternating current (AC) supply and having an output supplying a direct current (DC) bus that feeds a back end powering a lighting load, for example, a gas discharge lamp load such as a fluorescent lamp or other lamp load.

There is an increasing need to maximize the efficiency of electronic ballasts. In particular, in electronic dimming ballasts, the total energy consumed is the combination of the energy consumed by the electronic circuitry of the ballast and the energy consumed by the lighting load. In particular, as the lighting load is dimmed to lower levels, the energy consumed by the circuitry of the ballast comprises a greater proportion of the total energy consumed. The proportion of energy consumed by the ballast is typically greatest at the lowest dimming level. It is desirable, therefore, to reduce the amount of energy consumed by the ballast, particularly at low lighting levels.

As an example, a customer specification may call for a high-end input power usage of 35 watts, for example, at full lamp intensity. This may correspond, for example, to approximately 28 watts dissipated in the lamp load and 7 watts in the ballast.

At the low dimming level, corresponding to say, for example, a 10% dimming level, the input power to the ballast may be specified at approximately 10.5 watts or approximately 30% of the high end input power. Typical prior art electronic ballasts may consume approximately 5 watts of input power at the low end dimming level in the ballast. At the high end, the ballast may consume approximately 7 watts, or about ⅕ of the input power. At the low end, the ballast consumption of about 5 watts is about half of the input to the ballast. It is desirable to reduce the amount of power consumed by the ballast, particularly at the low end dimming level when the ballast consumes a greater proportion of the available input energy.

Some electronic dimming ballasts have an active front end for the purpose of reducing total harmonic distortion (THD) in the input line current and raising the power factor. Boost converters using switching transistors are often used for this purpose. However, the switching transistor typically has switching losses associated with its operation. These losses tend to be constant across the dimming range of the ballast. These switching losses are a fairly insignificant proportion of the total power consumed by the ballast and the load when the load is at high end. This is typically viewed as being acceptable in light of the advantages in improved THD and power factor. However, at low end, the improvements in THD and power factor are not as important because the line current drawn by the ballast and the load is much lower. Accordingly, the switching losses in the boost converter comprise a greater proportion of the power consumed by the ballast and the load, without the attendant improvements in THD and power factor.

SUMMARY OF THE INVENTION

According to the invention, a ballast for a lighting load is provided having a boost converter for converting a rectified AC input voltage into a DC bus voltage. The DC bus voltage is provided to an inverter output stage for driving the lighting load. According to the invention, in order to save energy, particularly when the lighting load is dimmed below a specified dimming level, the boost converter is turned off, thereby dissipating less power. When the boost converter is turned off, the DC bus voltage drops to essentially the peak value of the rectified AC input voltage. Because the lighting load has been dimmed, the higher bus voltage required at higher light levels is not necessary. By turning the boost converter off, in the example given of the ballast consuming approximately 5 watts of power at the low end dimming level, approximately 1.5 watts of power is saved due to eliminating switching losses in the boost converter. Accordingly, about 25% of the loss in the ballast at low end lighting levels has been eliminated by the invention.

According to one aspect, the invention comprises an electronic dimming ballast for driving a gas discharge lamp comprising an input stage receiving an alternating current input having a peak voltage level and providing a direct current voltage output having a boosted voltage level that is greater than the peak voltage level of the alternating current input, an output stage for converting the direct current voltage output into a high-frequency AC voltage for driving the lighting load, further wherein the input stage has a control input for reducing the direct current voltage output from the boosted voltage level to a reduced voltage level; further comprising a control stage responsive to a desired light level input for the lighting load and having an output coupled to the control input of the input stage for reducing the boosted voltage level to the reduced voltage level when the desired light level input drops to a first specified desired light level.

According to another aspect of the invention, a ballast for supplying a lighting load is provided comprising a power supply for a lighting load comprising a rectifier stage having an alternating current input and providing a rectified output voltage, a boost converter stage receiving the rectified output voltage as an input and providing a boosted direct current output voltage across a DC bus, an inverter output stage for converting the DC bus voltage to a high-frequency AC voltage to drive the lighting load, further comprising a control stage receiving a desired light level input controlling the desired light level of the lighting load and providing an output control signal for turning the boost converter stage on or off in dependency on the desired light level input.

According to another aspect, the invention comprises a method for reducing the power consumption of an electronic dimming ballast for a lighting load comprising receiving an alternating current input having a peak voltage level and providing a direct current voltage output having a boosted voltage level that is greater than the peak voltage level of the alternating current input, converting the direct current voltage output into a high-frequency AC voltage for driving the lighting load in an output stage, receiving a desired light level input corresponding to a desired light level of the lighting load and dimming the lighting load based on the desired light level, and reducing the boosted voltage level to a reduced voltage level when the desired light level input drops to a first specified desired light level.

Other objects features and advantages of the invention will become apparent from the following detailed description of the invention, which refers to the accompanying drawings.

BRIEF DESCRIPTION OF THE DRAWING(S)

The invention will now be described in greater detail in the following detailed description with reference to the drawings in which:

FIGS. 3D(a), (b), (c) and (d) show graphs illustrating the DC bus voltage (FIG. 3D(a)) as a function of time and the boost converter On/Off status (FIG. 3D(b)) and also showing in FIG. 3B(c) and 3D(d) the effects upon the light level due to the changes in the DC bus voltage in FIG. 3D(a)

DETAILED DESCRIPTION OF THE INVENTION

Figure 1:
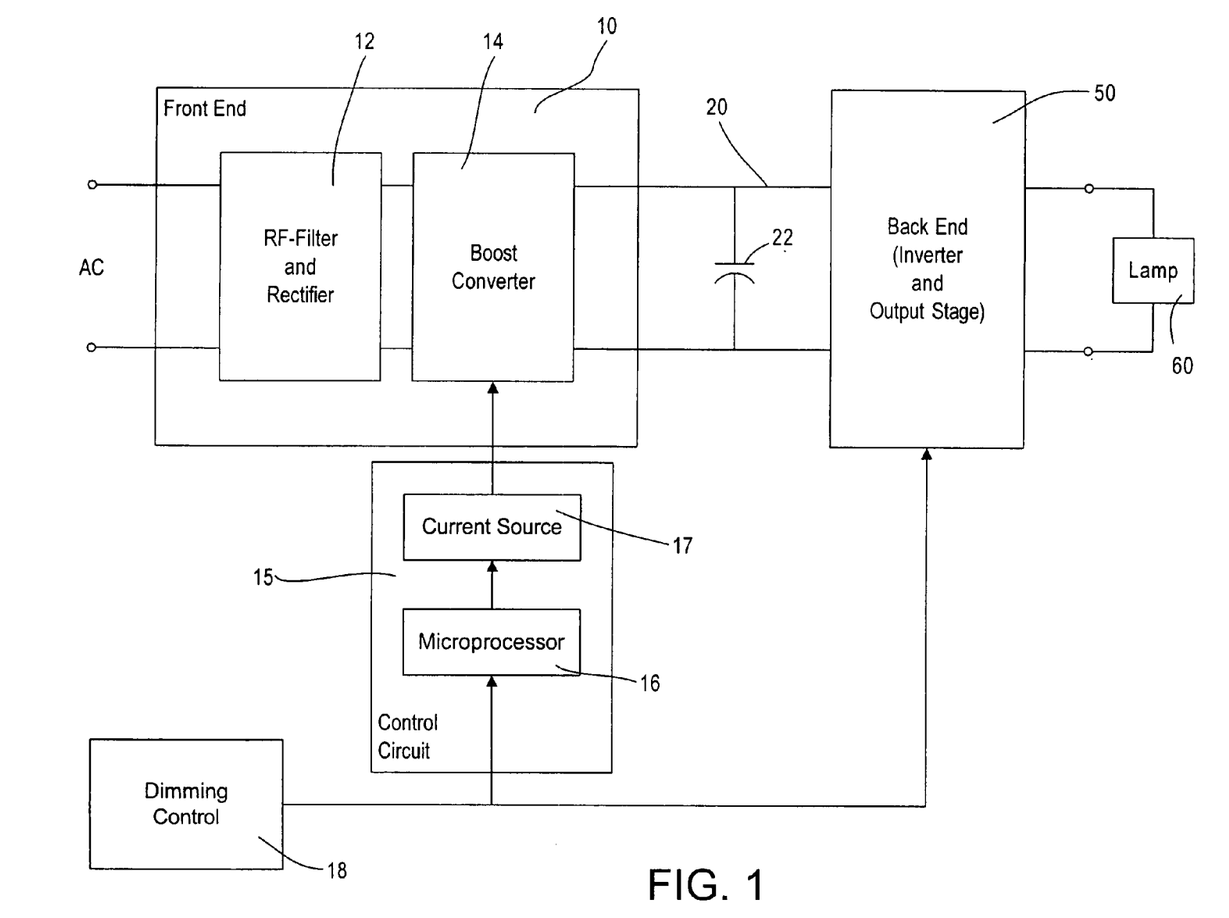
FIG. 1 is a block diagram of a ballast according to the present invention.

With reference now to the drawings, FIG. 1 shows a block diagram of the dimming ballast according to the present invention. The ballast has a front end circuit 10 and a back end circuit 50. The back end circuit, including an inverter circuit and an output stage, drives a lamp or lamps 60, for example, fluorescent lamps, high-energy discharge lamps, or other suitable lighting loads.

The front end circuit 10 receives an input from an AC supply, for example 277 volts RMS at 60 Hz. However, any suitable AC input voltage and line frequency can be supplied to power the ballast. The AC input is provided to an RF filter and rectifier stage 12, for example, an EMI filter stage and a full-wave rectifier, as well known to those of skill in the art. The output of the RF filter and rectifier stage 12 is fed to a boost converter stage 14 that is controlled by a control circuit 15, including a microprocessor 16 and a switchable current source 17. The microprocessor 16 receives an input from a dimming control 18 which might comprise, for example, a variable DC voltage that corresponds linearly to lamp light level. Any other suitable dimming control can be used. The output of the dimming control 18 is also fed to the back end 50 to control the light level of the lamp 60.

The output of the boost converter 14 is provided to a DC bus 20 having a bus capacitor 22 provided thereacross. If the input AC voltage is 277 volts RMS, the boost converter stage can provide, for example, a boosted voltage of 465 volts DC across the DC bus 20.

The DC bus voltage is fed to the back end 50, which comprises an inverter and an output stage, typically including a resonant tank circuit, as well known to those of skill in the art. The back end 50 provides a high-frequency AC voltage to the lamp load 60. The output of the dimming control 18 is used to control the magnitude of the high-frequency AC voltage provided to the lamp load 60, thereby controlling the light level.

An example of a typical inverter is shown, for example, in U.S. Pat. No. 6,452,344, the entire disclosure of which is incorporated by reference herein. In U.S. Pat. No. 6,452,344, a phase-cut dimmer is employed to provide a dimming level. The output of the phase-cut dimmer is converted by a phase-to-DC converter stage to a DC control level which controls the dimming level of the lamps coupled to the inverter/output stage. However, the basic inverter/output stage which comprises two switching transistors in a half-bridge configuration supplying the lamp load is substantially the same as the back end stage 50 of the present invention. In particular, the half-bridge transistors are driven by a driver integrated circuit (IC), for example an IR2111 driver IC, as shown in FIG. 5 of U.S. Pat. No. 6,452,344. This driver IC responds to a duty cycle control input comprising a variable DC voltage to set the light dimming level. The same IC may be used in the circuit of the present invention in the inverter/output stage 50.

Figure 2A:
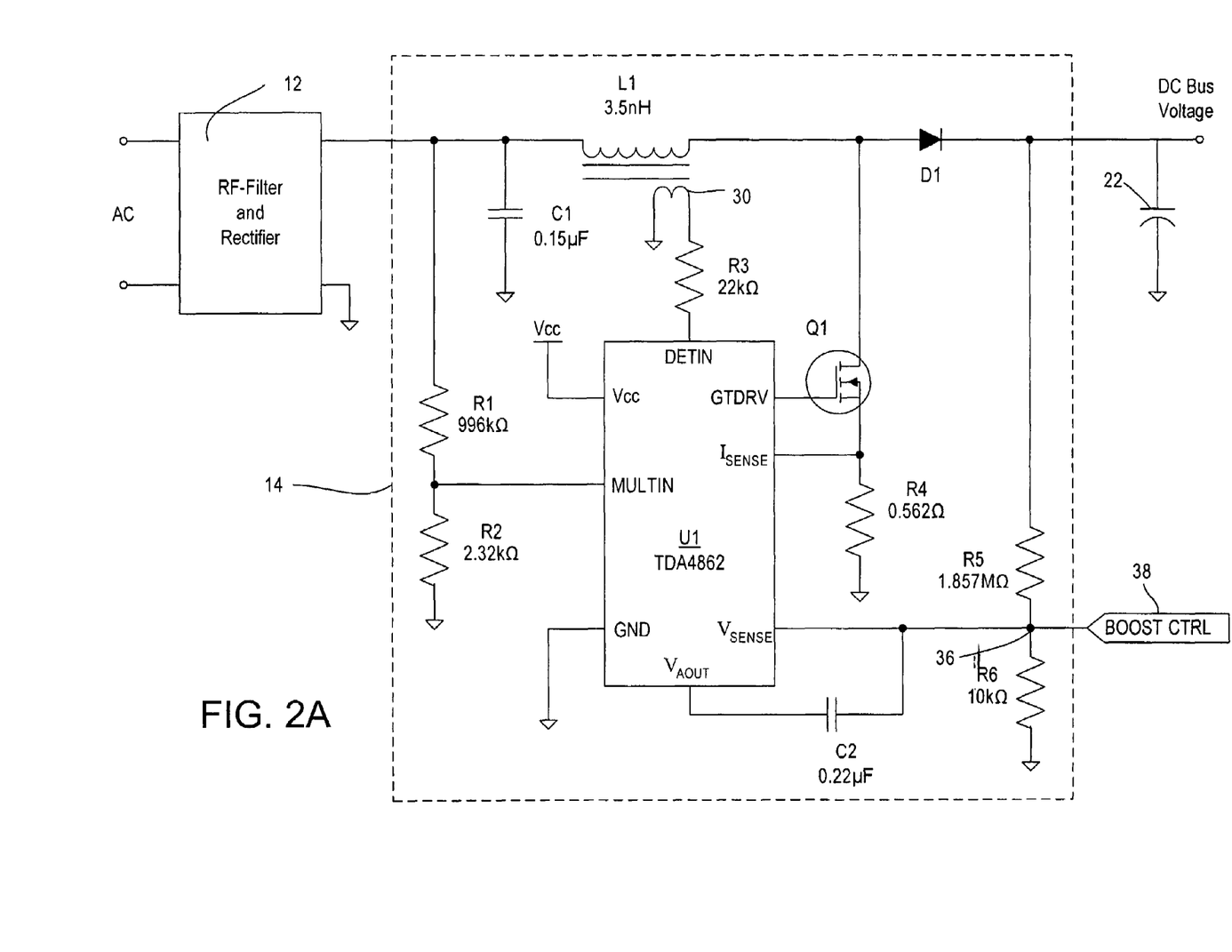
FIG. 2A is a simplified schematic diagram of the front end and bus capacitor of the ballast of FIG. 1.

Turning now to FIG. 2A, the boost converter stage 14 of FIG. 1 is shown in more detail. The output of the RF filter and rectifier 12 is supplied to an inductor L1, which is coupled in series with a boost diode D1 whose cathode is coupled to the bus capacitor 22. The drain of a power switching transistor Q1 is coupled to the junction of the inductor L1 and the anode of diode D1, and the source of transistor Q1 is coupled to circuit common through a current sense resistor R4.

Transistor Q1 is controlled by a control IC U1. The purpose of control IC U1 is to control the high-frequency switching of transistor Q1 to provide the desired output voltage across the bus capacitor 22. Transistor Q1 is also controlled by the control IC U1 in order to achieve power factor correction (PFC) so that the AC input current to the ballast closely follows, that is, is closely in phase with, the AC input voltage. Typically, it is desirable to achieve power factors of greater than 0.95, for example, in order to obtain maximum efficiency. An additional function of the control IC U1 is to minimize total harmonic distortion (THD) by maintaining the input current wave shape as sinusoidal as possible. This is beneficial in reducing electromagnetic interference (EMI).

As well known to those of skill in the art, PFC controllers like integrated circuit 34 typically accomplish this function by sensing a number of inputs including: the rectified line input voltage as provided at input MULTIN by voltage divider resistors R1 and R2, the current through transistor Q1 as determined at input $I_{SENSE}$ based on the voltage across resistor R4, the DC bus voltage at $V_{SENSE}$ as determined by divider resistors R5 and R6, and the zero-crossings of the current through inductor L1 utilizing input DETIN, which is coupled to an auxiliary winding 30 of the inductor through resistor R3. In this way, the transistor Q1 is switched to achieve the desired output voltage and maintain the desired AC input current wave shape and power factor. Although there are different schemes to switch transistor Q1, in a common scheme called critical conduction mode (CCM), the transistor Q1 is switched off when the inductor current, as measured through resistor R4, corresponds to the line voltage (thereby maintaining a sinusoidal envelope) and transistor Q1 is switched back on when the current through inductor L1, as measured at the auxiliary winding 30, is zero, thereby forcing the input current wave shape, to be in phase with the input voltage wave shape and be substantially sinusoidal.

The desired bus voltage level is achieved by control IC U1 monitoring the feedback voltage at the output 36 of the voltage divider comprising resistors R5 and R6. The feedback voltage is proportional to the DC bus voltage and is provided to the $V_{SENSE}$ input of control IC U1. The operation of power factor correction controllers, such as control IC U1, is well known to those of skill in the art. An example of a suitable power factor controller integrated circuit is the TDA 4862 manufactured by Infineon Technologies.

The basic operation of the boost converter topology is well known to those of skill in the art. When transistor Q1 is on, inductor L1 charges up to the maximum allowable inductor current (depending on how long transistor Q1 is on). When Q1 turns off, the inductor current flows through diode D1 to charge the bus capacitor 22. Since a back emf (electro motive force) is generated across the inductor proportional to the change in current, the voltage developed across the capacitor 22 is boosted above the peak output voltage of the RF filter and rectifier stage 12 by the induced voltage across the inductor. In this example, the peak rectified voltage is about 391V DC and the boosted voltage across the DC bus is about 465V DC.

According to the invention, the boost converter 14 shown in FIG. 2A is turned on and off as desired to improve efficiency. In particular, below a specified dimming level, the boost converter 14 is turned off to save energy. When the boost converter 14 is turned on, control IC U1 is actively switching transistor Q1 to produce the boosted DC bus voltage across the bus capacitor 22. Alternatively, when the boost converter is turned off, control IC U1 causes transistor Q1 to stop switching, such that the DC bus voltage drops to approximately the peak voltage at the output of the RF filter and rectifier stage 12, less the diode drop in boost diode D1. The control of the boost converter 14, from the on state to the off state, is obtained, according to the embodiment shown, by providing a control input 38 to the output 36 of the voltage divider comprising resistors R5 and R6.

Figure 2B:
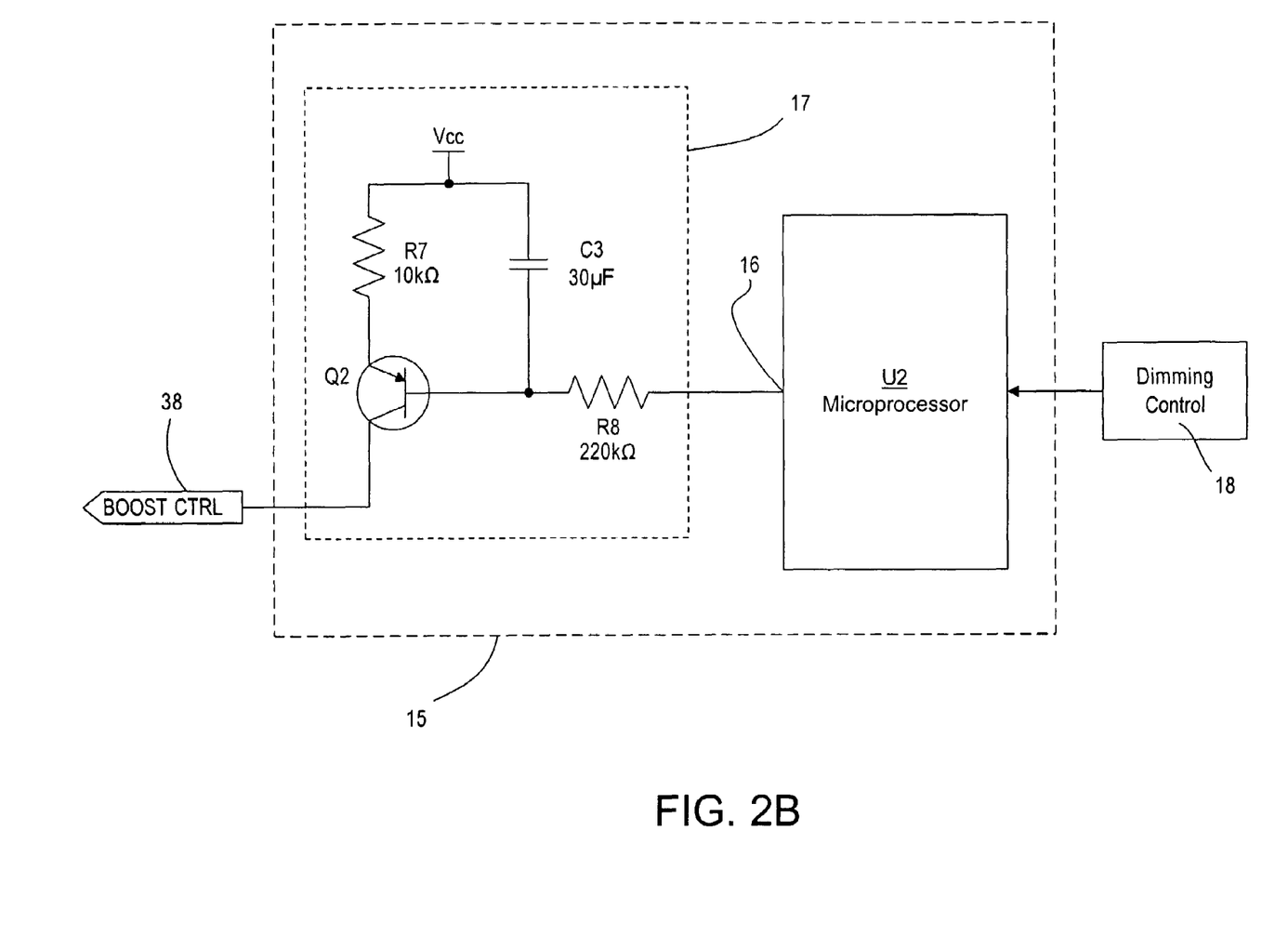
FIG. 2B is a simplified schematic diagram of the control circuit and dimming control portions of the ballast of FIG. 1.

In particular, the circuit to produce control input 38 is shown in FIG. 2B. Other methods can be used. The dimming control 18, which might comprise, for example, a variable DC voltage or a digital control signal, is provided to microprocessor U2. As the dimming level is reduced by dimming control 18, microprocessor U2 determines that the dimming level has reached a specified dimming level and issues a command at output 16 to turn the boost converter 14 off. As dimming control 18 increases the dimming level, the microprocessor U2 similarly determines that the dimming level has reached a different specified dimming level and the boost converter 14 is turned on.

FIG. 2B shows a schematic representation of control circuit 15 including microprocessor U2 and current source 17. The current source 17 includes a PNP transistor Q2, resistors R7, R8, and capacitor C3. If it is desired that the boost converter 14 be turned on, the output 16 of microprocessor U2 comprises a high logic level, which maintains PNP transistor Q2 non-conductive. With transistor Q2 non-conductive, the voltage divider comprising resistors R5 and R6 is not affected. When transistor Q2 is off, substantially no current is supplied to the voltage divider comprising resistors R5 and R6 and control IC U1 functions in its normal fashion to control the high-frequency switching operation of transistor Q1 to provide the required DC output voltage, power factor correction, and THD improvement.

When it is desired to turn the boost converter 14 off to save energy, such as at the specified dimming level (for example, 10%), microprocessor U2 provides a low logic level voltage on output 16. At this time, capacitor C3 begins to charge through resistor R8. When the voltage across capacitor C3 exceeds the base-emitter turn-on voltage of transistor Q2 (approximately 0.7V), transistor Q2 begins to conduct. The current into the emitter of transistor Q2 is set by the voltage across resistor R7, which is essentially the voltage across capacitor C3 minus the base-emitter voltage of transistor Q2. The collector current out of transistor Q2 is simply the emitter current less the base current (determined by the gain of transistor Q2). This collector current is provided to the boost control input 38, and thus, the output 36 of the voltage divider comprising resistors R5 and R6. Since the supplied current from the current source 17 will flow through resistor R6 to circuit common, the voltage at the output 36 of the voltage divider, and thus, the $V_{SENSE}$ input of control IC U1, will rise. As the voltage at the $V_{SENSE}$ input rises, control IC U1 compensates by controlling the boost converter switch Q1 to lower the DC bus voltage out of the boost converter 14. Eventually, control IC U1 will cause the boost converter switch Q1 to stop switching, thus turning off the boost converter 14.

Figure 3A:
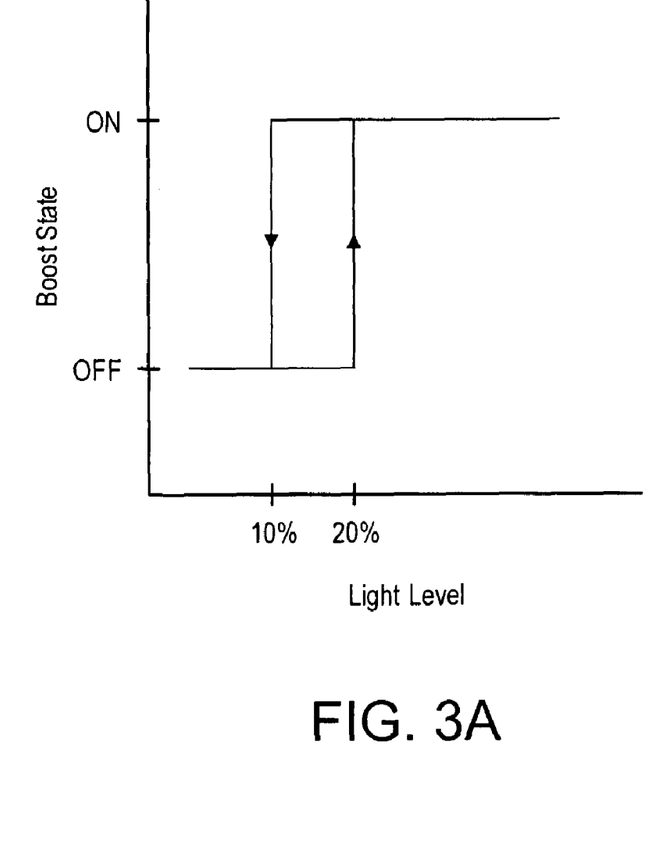
FIG. 3A is a graph showing how the On/Off status of the boost converter is controlled in dependence on light level.
Figure 3B:
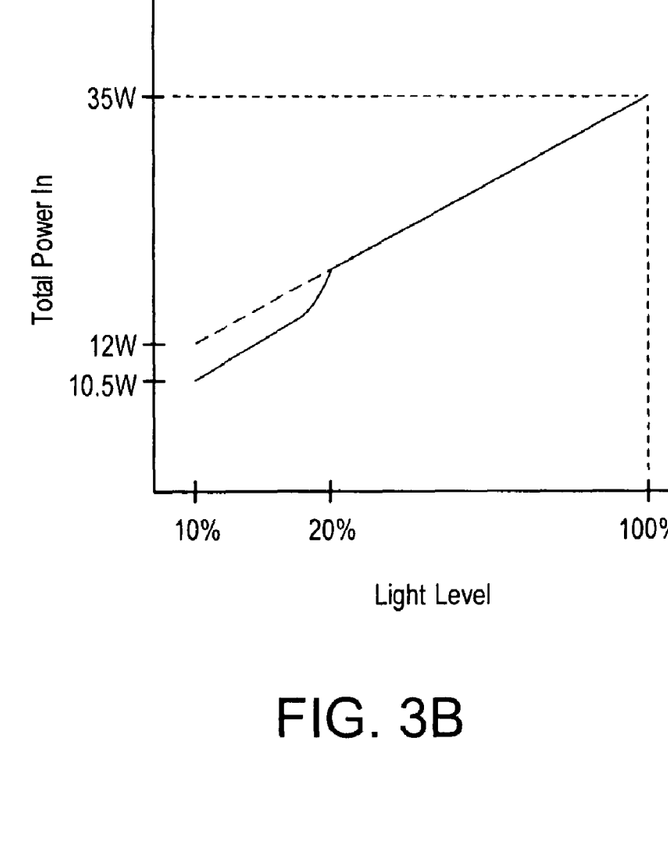
FIG. 3B is a graph depicting power consumption of the ballast and the load versus light level.
Figure 3C:
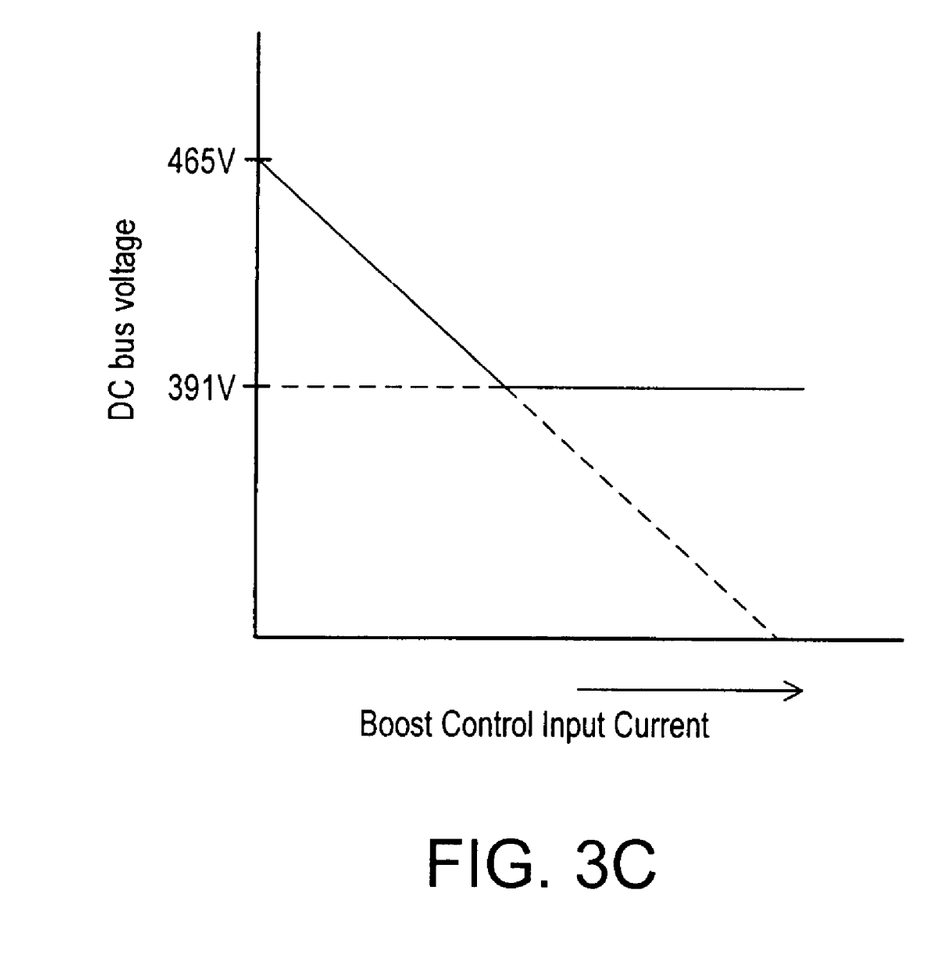
FIG. 3C illustrates the DC bus voltage as a function of the boost control current which controls whether the boost converter is on or off.
Figure 3D:
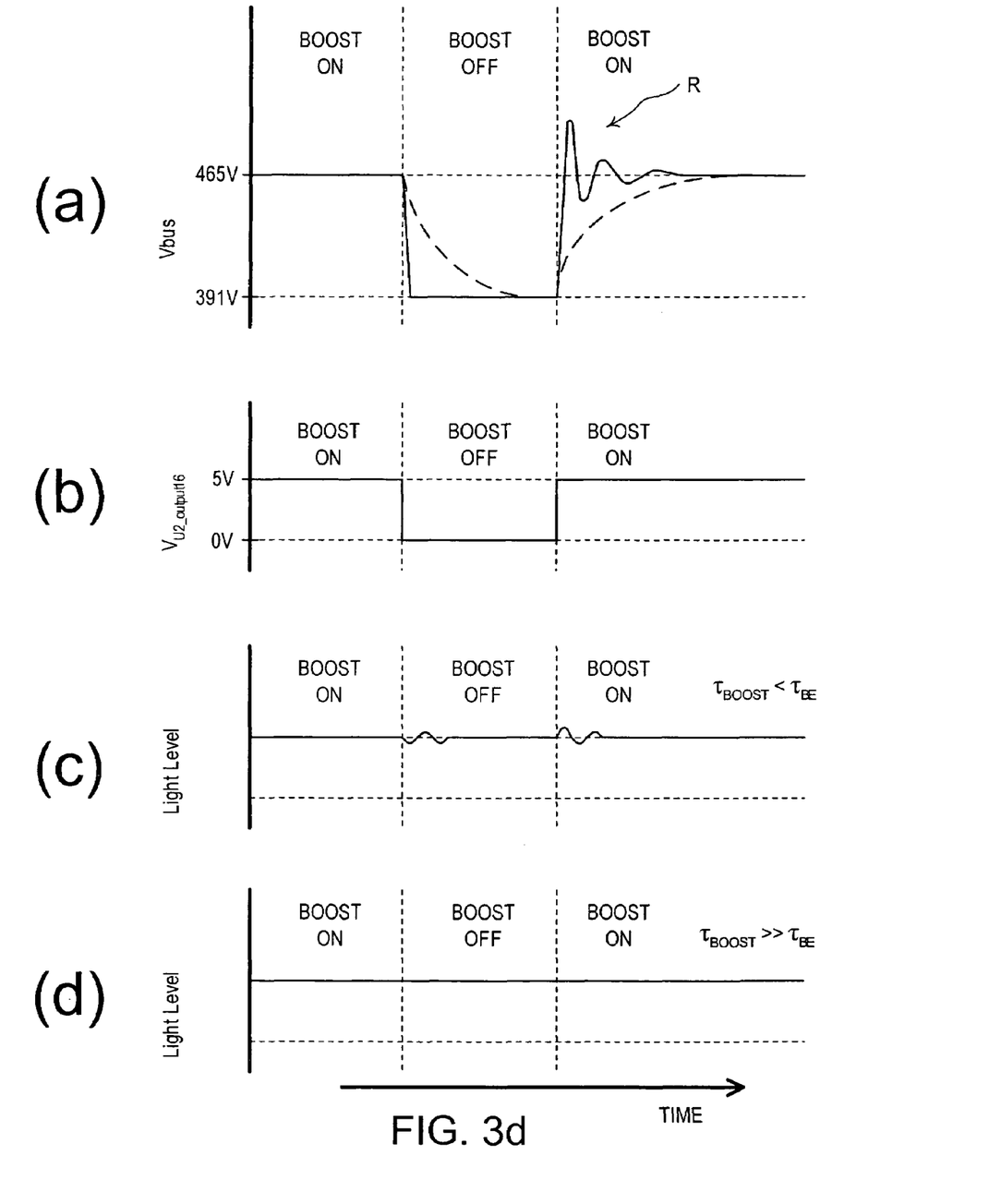

FIGS. 3a, 3b and 3c show how the boost converter is controlled. As shown in FIG. 3A, when a light level below a first predetermined level of approximately 10% is reached, the boost converter is turned off. As also shown in FIG. 3A, it is desirable, although not required, to provide hysteresis in the control of the boost converter. Accordingly, the boost converter might be turned on when the light level is increased to a second predetermined level, in this example, about 20%. Hysteresis is desirable in order to prevent the situation that might occur if the dimming level is exactly at the level at which switching occurs. Without the hysteresis, the control circuit could switch the boost converter repeatedly between the on and off status if the dimming level were set precisely at the level at which switching occurs.

The illustrated control circuit utilizes a microprocessor U2. However, it should be appreciated that a microprocessor is not required and that a simple analog or digital circuit could be provided to implement the control function.

FIG. 3B shows the effect on input power to the ballast by controlling the on/off status of the boost converter. As shown in FIG. 3B, when the boost converter is turned off between the illustrated 10% and 20% dimming levels, the input power requirements to the ballast during low level dimming operation is reduced by approximately 1.5 watts.

FIG. 3C shows the DC bus voltage versus the boost control input current from the current source 17. When the boost converter is on and the boost control current from transistor Q2 is at zero, the DC bus voltage is about 465 volts in the illustrated embodiment for a 277 volt AC RMS input voltage. When the boost converter is turned off and transistor Q2 begins to supply current to the voltage divider comprising resistors R5 and R6, the bus voltage drops to a voltage near the peak voltage at the output of the RF-filter and rectifier 12, which is approximately 391 volts for a 277 volt RMS AC input. As the boost control input current increases, the DC bus voltage decreases down to, and then levels off at, the peak voltage level of about 391 volts. The DC bus voltage does not drop below the peak voltage level of 391 volts for boost control input current increases beyond this point because the control IC U1 simply maintains transistor Q1 in an off state. The output voltage remains at approximately the peak voltage level of the rectifier output as smoothed by the bus capacitor 22.

Returning to FIG. 2B, resistor R8 and capacitor C3 perform a desirable function in the boost control circuit 15 according to the invention. Without the time constant provided by resistor R8 and capacitor C3, the boost converter would be turned on and off quickly as shown by the solid lines in FIG. 3D(a). When the boost converter is turned on rapidly, the DC bus voltage will exhibit ringing as illustrated by R in FIG. 3D(a). This ringing in the DC bus voltage is manifested as a fluctuation in the light level output of the lamp as shown in FIG. 3D(c). FIG. 3D(b) shows the boost control output of the microprocessor U2 on output 16. Without the time constant provided by resistor R8 and capacitor C3, the light level would show a noticeable perturbation as shown in FIG. 3D(c) when the boost converter is switched on and off. This is due to the fact that the time constant of the boost control circuit (without an appropriately sized time constant provided by resistor R8 and capacitor C3) is less than the time constant of the back end circuit 50. Time constant means the time required for an output of a first-order system, forced by a step or an impulse, to rise or decay to 63.2% its final or steady state value. For the back end, the time constant is the time required for the control circuit of the back end to return the lamp current to 63.2% of its steady state value in response to a step perturbation in the lamp current. For the boost converter, the time constant is the time required for the current source 17 to reach 63.2% of its steady state current in response to a step change in the input from the microprocessor U2.

In order to avoid the perturbation in the light level caused when the boost converter is turned on and off, the time constant of the boost converter control circuit 15 should be significantly greater than the time constant of the back end circuit 50. Resistor R8 and capacitor C3 achieve this effect. Accordingly, when the boost converter circuit 14 is turned off and turned on, it is turned off and turned on slowly due to the time delay provided by the RC time constant of resistor R8 and capacitor C3. In other words, it is desirable to have the DC bus voltage change slowly enough such that the back end 50 maintains the lamp current, and thus the light level, substantially constant as the boost converter 14 turns off and turns on. This is indicated by the gradual turn off and turn on shown by the dashed lines of FIG. 3D(a). This causes the light level to be smoothed out as shown in FIG. 3D(d).

As an alternative to the embodiment shown herein, one may also achieve the desired result by making the DC bus slow to respond to changes in bus voltage by increasing the size of the bus capacitor 22. For example, in the preferred embodiment, the DC bus has an inherent time constant of about 0.2 second, or about twice that of the back end. The inherent response time of the bus is slowed down by the boost converter control circuit. However, the bus capacitor could be increased until the DC bus has a suitably large time constant, preferably at least ten times that of the back end. One disadvantage of this alternative embodiment is that the necessarily large bus capacitance required becomes undesirably large and expensive.

In an exemplary embodiment, the time constant of the back end circuit is approximately 0.1 second and it is desirable, in order to avoid perceptible perturbations in the light level, to have the time constant of the boost control circuit be approximately one order of magnitude greater, and in particular, about 6 seconds. This is illustrated by providing R8 having a resistance of 220 k$\Omega$ and C3 having a capacitance of 30 $\mu$F. This provides a time constant of approximately 60 times the time constant of the back end circuit.

Figure 4:
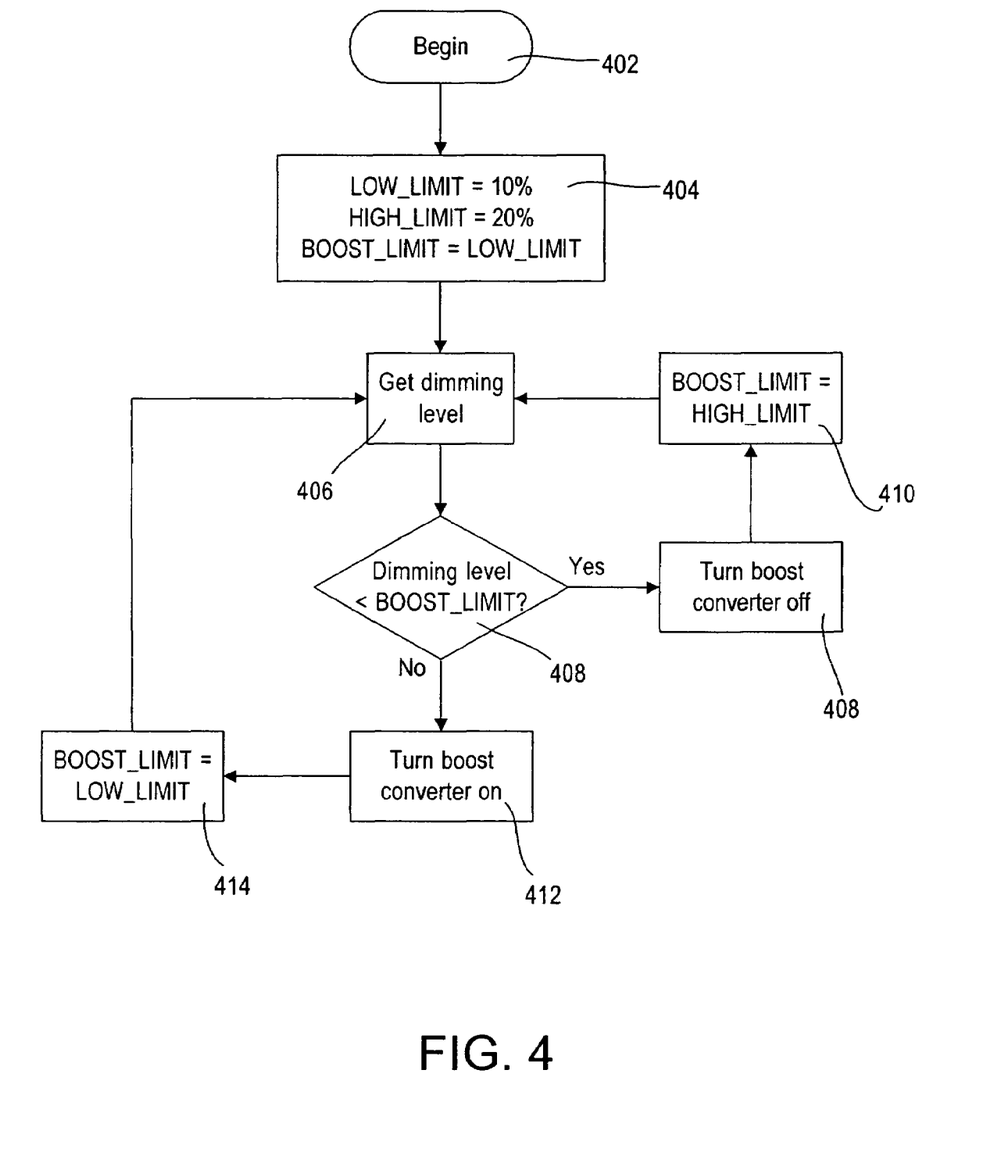
FIG. 4 is a flowchart of a first embodiment of the control of the boost converter of FIG. 2A by the control circuit of FIG. 2B.

FIG. 4 is a flow chart of the program implemented in the microprocessor U2 in order to control the on/off status of the boost converter in relation to the desired light level of the lighting load. As shown, when the desired light level is reduced to about 10%, the boost converter is turned off, and when the desired light level is increased to about 20%, the boost converter is turned back on. A time delay may also be implemented so that the switching only occurs after the desired light level has remained at the level for a certain delay time.

Refering to FIG. 4, the process defining the control of the boost converter begins at step 402. At step 404, a few variables that will be used in the process are initialized. LOW_LIMIT, which represents the desired light level at which the boost converter will be turned off, is set at 10%. HIGH_LIMIT, which represents the desired light level at which the boost converter will be turned on, is set at 20%. BOOST_LIMIT is set to the value of LOW_LIMIT, i.e. 10%, which assumes that the boost converter is on at the beginning of the process. The desired light level is retrieved at step 406. If this desired light level is less than BOOST_LIMIT at step 408, the boost converter is turned off at step 410 and the BOOST_LIMIT variable is now set to HIGH_LIMIT at step 412. However, if the desired light level retrieved at step 406 is greater than BOOST_LIMIT at step 408, the boost converter is turned on at step 414 and the BOOST_LIMIT variable is set to LOW_LIMIT at step 416. The process continues to loop turning on and off the boost converter and alternating the value of BOOST_LIMIT between LOW_LIMIT and HIGH_LIMIT. In this way, the hysteresis shown in FIG. 3A is implemented.

Figure 5:
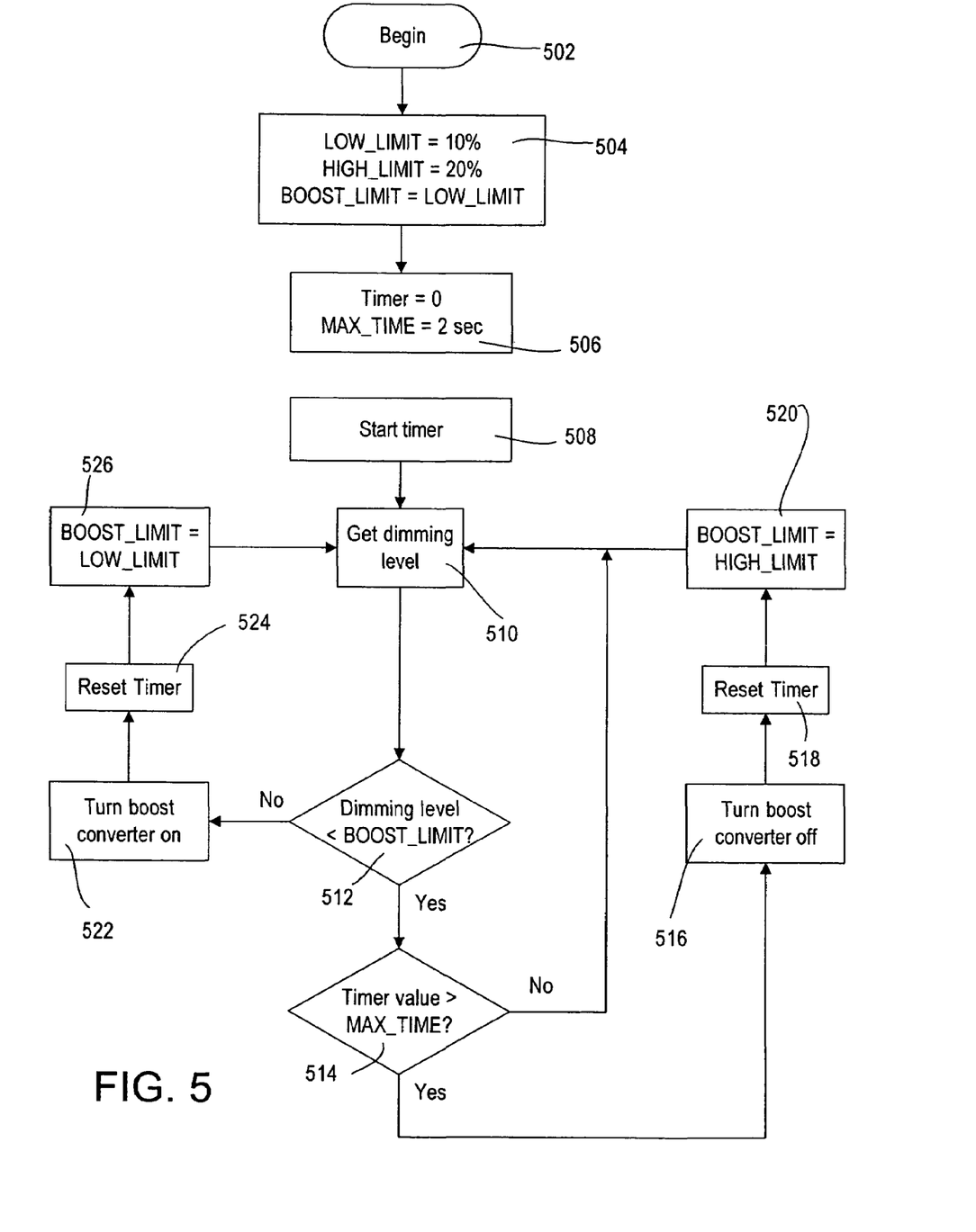
FIG. 5 is a flowchart of a second embodiment of the control of the boost converter of FIG. 2A by the control circuit of FIG. 2B.

In an alternative embodiment shown in FIG. 5, it may be desired to introduce a time delay prior to turning the boost converter off. For example, one may desire to implement a delay of two to five seconds before turning off the boost converter, so as to further avoid unnecessary cycling of the boost converter.

With reference to FIG. 5, the process for control of the boost converter including a time delay begins at step 502. Once again, the variables LOW_LIMIT, HIGH_LIMIT, and BOOST_LIMIT are initialized at step 504. At step 506, a timer counter is set to zero and the MAX_TIME variable is set to 2 seconds. The timer is started at step 508. At step 510, the desired dimming level is retrieved. If this desired light level is less than the BOOST_LIMIT variable at step 512, the process moves to step 514, where a determination is made on whether the timer value is greater than the MAX_TIME variable. If not, the process moves back to step 510. If the timer value is greater than the MAX_TIME variable at step 514, then the boost converter is turned off at step 516, the timer is reset to zero at step 518, and BOOST_LIMIT is set to HIGH_LIMIT at step 520. If the desired light level is greater than BOOST_LIMIT at step 512, then the boost converter is turned on at step 522, the timer is reset to zero at step 524, and BOOST_LIMIT is set to LOW_LIMIT at step 526.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. An electronic ballast for driving a gas discharge lamp, comprising:
   a rectifier stage for receiving an alternating current (AC) input voltage from an AC supply to produce a rectified voltage having a peak voltage amplitude;
   a boost converter stage for receiving the rectified voltage and for providing a direct current (DC) bus voltage having a DC magnitude; the boost converter stage having an on state, in which the DC magnitude of the DC bus voltage is greater than the peak voltage amplitude of the rectified voltage, and an off state, in which the DC magnitude of the DC bus voltage is substantially equal to the peak voltage amplitude of the rectified voltage;

an inverter output stage for converting the DC bus voltage to a high-frequency AC output voltage to drive the lamp;

further comprising:

a control stage for receiving a desired light level signal representative of a desired light level of the lamp and for providing an output control signal to said boost converter stage;

wherein the boost converter stage changes between the on state and the off state dependent on the desired light level signal.

2. The ballast of claim 1, wherein the boost converter stage changes to the off state responsive to the desired light level signal when the desired light level signal is representative of a light level below a first predetermined light level threshold.

3. The ballast of claim 2, wherein the boost converter stage changes to the on state responsive to the desired light level signal when the desired light level signal is representative of a light level above the first predetermined light level threshold.

4. The ballast of claim 2, wherein the boost converter stage changes to the on state responsive to the desired light level signal when the desired light level signal is representative of a light level above a second predetermined light level threshold greater than the first predetermined light level threshold.

5. The ballast of claim 1, wherein the inverter output stage has a first time constant and the control stage comprises a circuit responsive to the desired light level for causing the boost converter stage to transition between the on state and the off state at a rate determined by a second time constant;

wherein the second time constant is larger than the first time constant.

6. The ballast of claim 5, wherein the second time constant is at least one order of magnitude greater than the first time constant.

7. The ballast of claim 5, wherein the second time constant is determined by an R-C time constant.

8. The ballast of claim 7, wherein the R-C time constant is about 60 times larger than the first time constant.

9. The ballast of claim 1, wherein the control stage comprises a current source.

10. The ballast of claim 9, wherein the boost converter stage comprises a voltage divider having an input for receiving the DC bus voltage and an output for providing a feedback voltage proportional to the DC bus voltage;

wherein the boost converter determines the DC magnitude of the DC bus voltage dependent on the feedback voltage of the voltage divider; and wherein an output of the current source is provided to the output of the voltage divider.

11. The ballast of claim 10, wherein, when the current source is delivering current to the voltage divider output, the feedback voltage is driven to a voltage level causing the control circuit to change the boost converter to the off state.

12. The ballast of claim 10, wherein the control stage comprises a microprocessor having an input for receipt of the desired light level signal and an output coupled to the current source for controlling the delivery of current to the voltage divider output responsive to the desired light level signal.

13. A ballast for driving a gas discharge lamp, comprising:

an input stage operable to receive an alternating current (AC) input voltage having a peak voltage level and to provide a direct current (DC) bus voltage having a boosted voltage level that is greater than the peak voltage level of the AC input voltage;

an output stage for converting the DC bus voltage into a high-frequency AC output voltage for driving the lamp;

further wherein the input stage has a control input; further comprising:

a control stage responsive to a desired light level signal and having an output coupled to the control input of the input stage for sending an input stage control signal representative of a desired input stage mode of operation;

wherein the input stage changes the DC bus voltage between the boosted voltage level and a reduced voltage level based on the input stage control signal.

14. The ballast of claim 13, wherein the input stage reduces the DC bus voltage from the boosted voltage level to the reduced voltage level responsive to the desired light level signal representing a light level below a first predetermined light level.

15. The ballast of claim 14, wherein the input stage increases DC bus voltage from the reduced voltage level to the boosted voltage level responsive to the desired light level signal representing a light level above a second predetermined light level.

16. The ballast of claim 15, wherein the first and second predetermined light levels are the same.

17. The ballast of claim 15, wherein the second predetermined light level is greater than the first predetermined light level.

18. The ballast of claim 13; wherein:

the input stage comprises a rectifier stage for receiving the AC input voltage and for providing a rectified voltage; and a boost converter stage for receiving the rectified voltage and operable to provide the boosted voltage level on a DC bus; and further wherein the output stage comprises:

an inverter stage for converting the DC bus voltage to the high-frequency AC output voltage to drive the lamp;

further wherein the inverter stage determines the light level of the lighting load dependent on the desired light level signal.

19. The ballast of claim 18, wherein the output stage has a a first time constant and the control stage comprises a circuit responsive to the desired light level signal for causing the boost converter stage to transition the DC bus voltage between the boosted voltage level and the reduced voltage level at a rate determined by a second time constant that is larger than the first time constant.

20. The ballast of claim 19, wherein the second time constant is at least one order of magnitude greater than the first time constant.

21. The ballast of claim 19, wherein the second time constant is determined by an R-C time constant.

22. The ballast of claim 21, wherein the R-C time constant is about 60 times larger than the first time constant.

23. The ballast of claim 18, wherein the control stage comprises a current source that is turned on and off by a current source control signal.

24. The ballast of claim 23, wherein the boost converter stage comprises a voltage divider providing an output proportional to the DC bus voltage, a control circuit responsive to the output of the voltage divider, and a boost converter switch responsive to the control circuit for determining the DC bus voltage, and wherein an output of the current source is provided to the output of the voltage divider.

25. The ballast of claim 24, wherein, when the current source is turned on, the output of the voltage divider is driven to a voltage level causing the control circuit to turn the boost converter switch off.

26. The ballast of claim 25, wherein, when the boost converter switch is off, the DC bus voltage drops to the reduced voltage level substantially corresponding to the peak voltage level of said alternating current input.

27. The ballast of claim 24, wherein the control stage comprises a microprocessor having an input coupled to receive the desired light level signal.

28. A method for reducing the power consumption of a ballast for driving a gas discharge lamp comprising the steps of:
receiving an alternating current input voltage having a peak voltage level and providing a direct current output voltage having a boosted voltage level that is greater than the peak voltage level;
converting the direct current output voltage into a high-frequency alternating current voltage in an output stage for driving the lamp;
receiving a desired light level signal corresponding to a desired light level of the lamp and controlling the light level of the lamp based on the desired light level; and
reducing the direct current output voltage from the boosted voltage level to a reduced voltage level when the desired light level signal is below a first predetermined desired light level.

29. The method of claim 28, further comprising increasing the direct current output voltage from the reduced voltage level to the boosted voltage level when the desired light level signal is above a second predetermined desired light level.

30. The method of claim 29, wherein the first and second predetermined desired light levels are the same.

31. The method of claim 29, wherein the first and second predetermined desired light levels are different.

32. The method of claim 31, wherein the second predetermined desired light level is greater than the first predetermined desired light level.

33. The method of claim 28, further comprising:
receiving the alternating current input voltage and providing a rectified output voltage; and
receiving the rectified output voltage as an input and providing the direct current output voltage having the boosted voltage level across a DC bus with a boost converter stage.

34. The method of claim 33, wherein the output stage has an output stage time constant and further comprising turning the boost converter stage on and off at a rate determined by a boost on/off time constant that is larger than the output stage time constant.

35. The method of claim 34, wherein the boost on/off time constant is at least one order of magnitude greater than the output stage time constant.

36. The method of claim 34, wherein the boost on/off time constant is determined by an R-C time constant.

37. The method of claim 36, wherein the R-C time constant is about 60 times larger than the output stage time constant.

38. The method of claim 33, further comprising switching a switchable current source in response to a boost on/off control signal to turn the boost converter stage on and off.

39. The method of claim 38, further comprising providing a voltage divider providing an output proportional to the direct current output voltage, and further comprising receiving the output of the voltage divider for controlling the operation of a boost converter switch, and further comprising providing an output of the switchable current source to the output of the voltage divider.

40. The method of claim 39; further wherein, when the switchable current source is turned on, the output of the voltage divider is driven to a voltage level causing the control circuit to turn the boost converter switch off.

41. The method of claim 40, further wherein, when the boost converter switch is off, the direct current output voltage drops to the reduced voltage level substantially corresponding to the peak voltage of said alternating current input voltage.

42. The method of claim 39, further comprising using a microprocessor having an input coupled to receive the desired light level signal to control the operation of the boost converter stage.

43. The method of claim 39, further comprising providing the desired light level signal to an inverter of the output stage to control the light level of the lamp.

* * * * *